Figure 1:
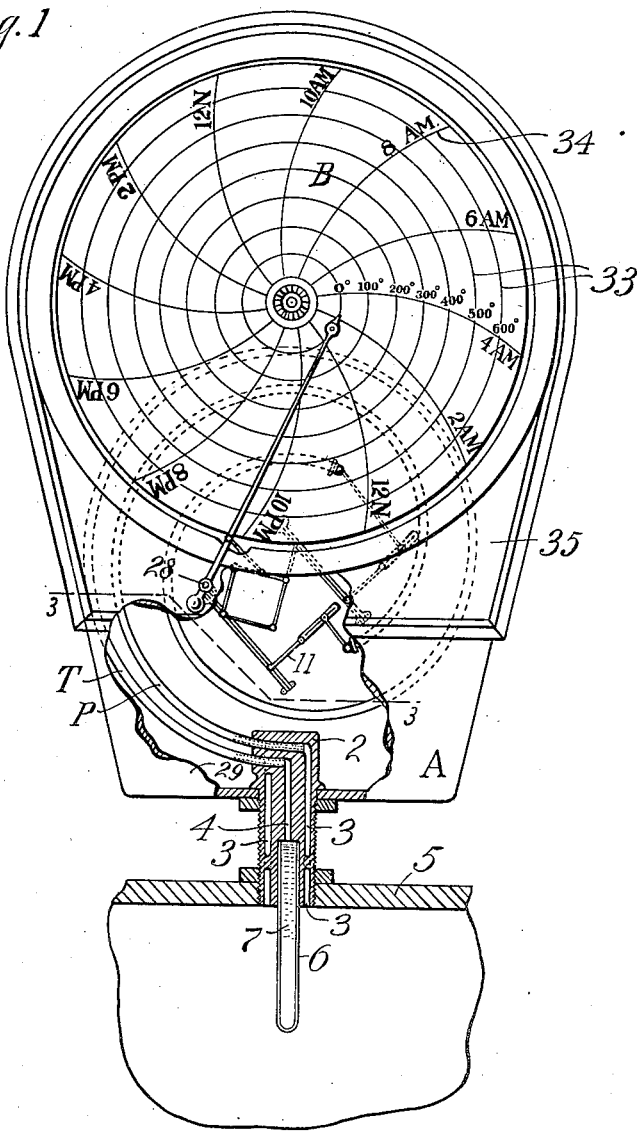

T. M. LOTHROP & G. D. BRADSHAW.
SUPERHEAT GAGE.
APPLICATION FILED JUNE 6, 1907.

943,260.

Patented Dec. 14, 1909.

Witnesses,
George Voelker
Hattie Smith

Inventors,
Thomas M. Lothrop
Grant D. Bradshaw
by Lothrop & Johnson
their Attorneys.

T. M. LOTHROP & G. D. BRADSHAW.
SUPERHEAT GAGE.
APPLICATION FILED JUNE 6, 1907.
943,260.
Patented Dec. 14, 1909.
2 SHEETS—SHEET 2.
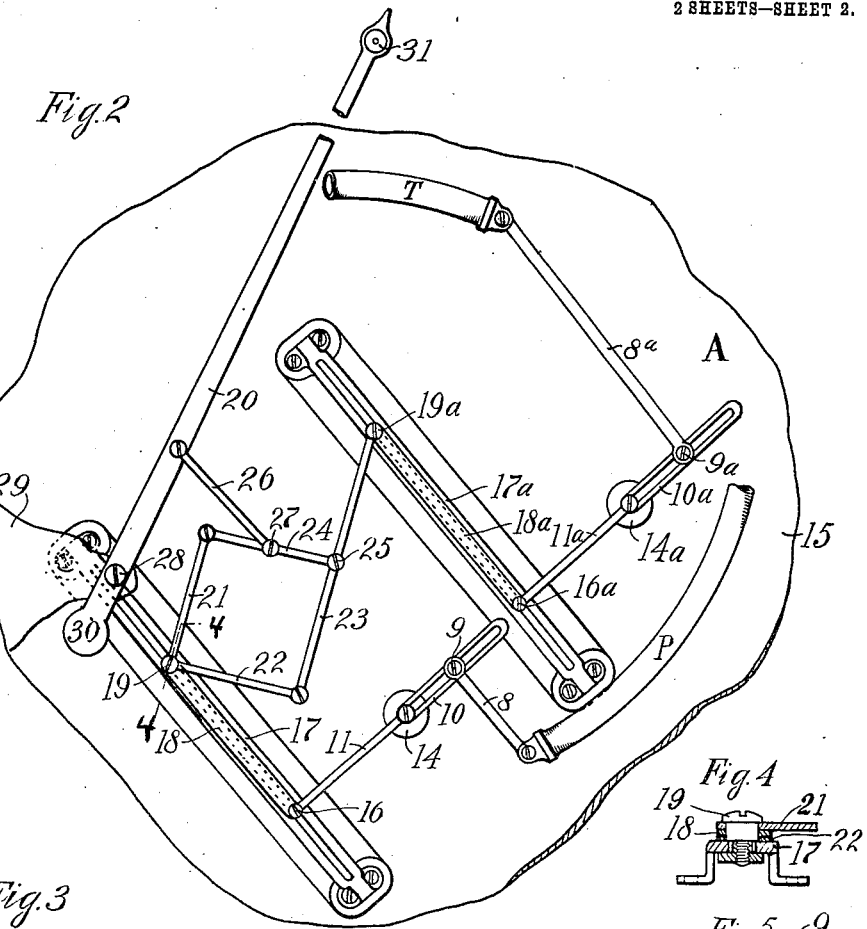
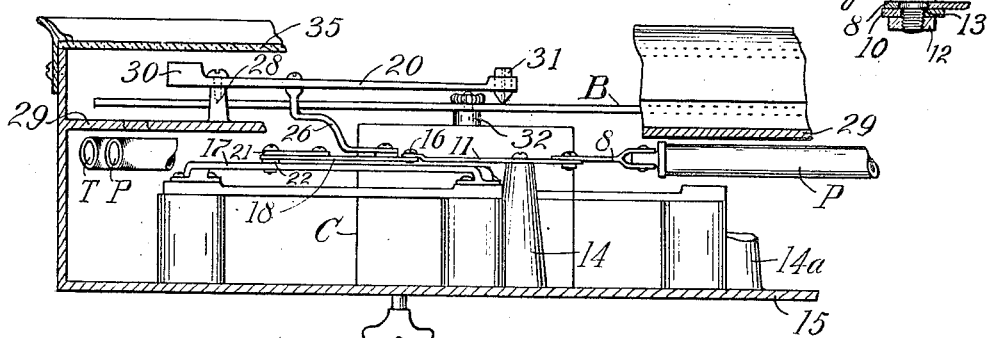
Witnesses,
George Voelker
Hattie Smith
Inventors,
Thomas M. Lothrop
Grant D. Bradshaw
by Lothrop & Johnson
their Attorneys.

UNITED STATES PATENT OFFICE.

THOMAS M. LOTHROP AND GRANT D. BRADSHAW, OF JOLIET, ILLINOIS.

SUPERHEAT-GAGE.

943,260.   Specification of Letters Patent.   Patented Dec. 14, 1909.

Application filed June 6, 1907. Serial No. 377,498.

*To all whom it may concern:*

Be it known that we, THOMAS M. LOTHROP and GRANT D. BRADSHAW, citizens of the United States, residing at Joliet, in the county of Will and State of Illinois, have invented certain new and useful Improvements in Superheat-Gages of which the following is a specification.

Our invention relates to improvements in superheat gages, and has for its object to provide a gage for measuring and indicating the amount of superheat in superheated gases, such as steam, that is the degree of heat above the saturation point of the gas at the pressure to which it may at the time be subjected.

To that end the invention consists in the construction, combination and arrangement of parts hereinafter described and claimed.

In the drawings we have shown a superheat gage embodying our invention applied to the steam chamber of a superheater to measure and record the varying amount of superheat existing throughout a certain period of time. It is well known that the temperature of the saturation point of steam varies in the same direction as the pressure, rising as the pressure increases and falling as the pressure decreases, so that a pressure-actuated indicator working over a scale or dial properly calibrated for temperatures would show the saturation temperature at the existing pressure. An ordinary thermometer would indicate the absolute temperature. The difference between the readings would be the amount of superheat. In the present invention the indicating mechanism is so designed as to be acted upon oppositely by pressure and temperature so that the resultant movement will represent the superheat alone.

In the accompanying drawings forming part of the specification, Figure 1 is a front elevation of a superheat gage embodying the invention, shown partly broken away; Fig. 2 is a plan view of the pointer and the lever mechanism on an enlarged scale, showing the frame or casing partly broken away; Fig. 3 is a cross section on the irregular line 3—3 of Fig. 1; Fig. 4 is a detail of one of the parallel-motion links and slides in section on line 4—4 of Fig. 2, and Fig. 5 is a detail of one of the pivot-clamps adjustable in the slotted lever.

In the drawings A represents a suitable casing or frame to inclose and support the operative parts of the gage. Passing through the bottom of the casing is a plug 2 having ports 3 and 4 extending longitudinally through it. The port 3 is shown annular in shape, so as to surround the port 4, and maintain the temperature therein. The plug is made, preferably, with a threaded outer or lower end so that it may be screw-fitted into the shell 5 of a chamber for superheated steam.

Fitted within the lower end of the central port 4 is an outwardly projecting tube or bulb 6 closing the port to communication with the steam chamber, and containing mercury, air or any other expansible fluid 7. Fitting into the upper or gage ends of the ports 3 and 4 are coil spring tubes P and T, respectively, closed at their outer or free ends and both arranged, preferably, in the same vertical plane. The free ends of these tubes P and T are pivotally connected through the medium of links 8 and $8^a$, respectively, with the clamp bolts 9 and $9^a$, which are adjustable lengthwise in the slotted arms 10 and $10^a$ of the levers 11 and $11^a$, respectively. The bolts are secured in adjusted positions by means of nuts 12 and $12^a$, which pinch the slotted arms 10 and $10^a$ against the shoulders 13 and $13^a$ of the bolts, the bolt-portion above the shoulder serving as a pivot for the link to work upon. The bolts are made adjustable in the slotted levers in order to regulate the movement of the pointer 20 for purposes of calibration. It will be observed that the spring tubes are connected with the lever arms 10 and $10^a$ on opposite sides thereof so that the levers will be oppositely acted upon by the expanding of their respective tubes.

The levers 11 and $11^a$ are fulcrumed upon posts 14 and $14^a$, respectively, supported upon the rear wall 15 of the casing. Their acting ends are pivotally connected at 16 and $16^a$ with the links 18 and $18^a$, respectively. At their other ends these links are pivotally connected with pivot pins 19 and $19^a$ which have sliding support in the parallel guides or slides 17 and $17^a$. The sliding pins 19 and $19^a$ are connected with each other and with the pointer 20 by the parallel motion system of linkage shown in Fig. 2, whereby the resultant, only, of the movements of the tube actuated levers will be communicated to the pointer, as will be hereafter explained. This linkage comprises two links 21 and 22, preferably of equal length, pivotally connected with the sliding pin 19; a link 23, parallel with 21 and preferably double its length, pivotally connected at one end with the end of link 22 and at the other end with the sliding pin 19ᵃ; a link 24, parallel with 22, pivotally connected at one end with the end of link 21 and at the other end, by pivot 25, with the link 23, (preferably at the middle point thereof); and, lastly, a link 26 pivotally connected at one end, by pivot 27, with the link 24, (preferably at the middle point thereof), and at the other end with the pointer 20. Thus the links 21, 22, 24 and the adjacent portion of link 23 form a parallelogram, which, when the links are of equal length as shown, will be either a square or a rhomb according to the relative positions of the sliding pins 19 and 19ᵃ. In any case the pivot 27 will always lie in the straight line connecting the sliding pins 19 and 19ᵃ.

The pointer 20 is pivotally supported upon a post 28 carried by the web 29 of the casing, and its lower end is counter-weighted at 30 to balance the weight of the long indicating end and the connected moving parts. The outer end of the pointer carries a marker 31 which works over the face of a dial moved by clock work and graduated in one direction for time periods and in the other direction for degrees of superheat. In the drawings is shown a rotary dial B secured to the hour hand arbor 32 of clock work mechanism C supported within the casing. The pointer and dial are so positioned with respect to each other that the arc of the circle described by the end of the pointer will pass through the center of the dial. The dial is shown graduated with concentric circles 33 calibrated for degrees of superheat and with radial lines 34 following the curve described by the end of the pointer for indicating the hours of the day. The dial may be covered by a glass plate 35 carried by the casing.

In operation, the pressure of the steam entering through the port 3 into the tube P will exert upon the tube an expanding or straightening force, so that upon any increase in pressure the tube will expand, and, acting through the link 8, lever 11, and link 18, will push the pivot-pin 19 toward the pointer. Upon any decrease in pressure on the other hand, the tube will contract under the influence of its own resiliency, and, acting through the medium of the links and lever just mentioned, will pull the pivot-pin 19 away from the pointer. Similarly, the fluid within the bulb 6 will expand as the temperature of the steam rises and compress the air or other gas in the tube T, and thereby cause the tube to expand against its own resiliency, as in the case of tube P. In thus expanding or straightening, the tube, acting through link 8ᵃ, lever 11ᵃ and link 18ᵃ, will move the pivot-pin 19ᵃ; but being connected with its lever oppositely from tube P, it will in expanding draw the pivot-pin away from the pointer instead of pushing it toward the pointer as in the case of tube P. When the temperature of the steam falls, the fluid in the bulb will contract and the pressure in the tube diminish, and the tube will contract under its own resiliency and push the pivot-pin 19ᵃ toward the pointer. If, now, the pressure of the steam remains constant and the temperature rises, the pivot-pin 19 will remain stationary and the pivot-pin 19ᵃ will be drawn down, as described, and the linkage between the pins will turn on 19 as a pivot, drawing the pointer away from the center of the dial, so as to indicate an increase in superheat. Conversely, if the temperature remains constant and the pressure increases, the pin 19 will be forced up toward the pointer and the linkage will turn on 19ᵃ, which remains stationary, as a pivot, forcing the pointer up toward the center of the dial, so as to indicate a less amount of superheat. If the pressure in both tubes increases or diminishes at the same time by a coincident increase in the pressure and temperature of the steam in the superheat chamber, the pointer will be moved a distance corresponding to the difference between the oppositely acting forces, and in the direction urged by the greater; and where the increase or diminution of pressure in both tubes is the same, or rather such as to impart the same amount of movement to each of the pivot pins 19 and 19ᵃ, the linkage, if arranged as an equal sided parallelogram, will merely oscillate about the pivot 27, and the pointer will remain stationary.

As the dial is operated by clock work and is marked radially at intervals corresponding with the hours or other desired time periods of the day, the pointer will indicate not only the degrees of superheat set off upon the radial lines but also the time of the reading. And the marker, if adjusted to engage or contact with the face of the dial, will trace upon it, as it moves by clock work, a continuous line which will record graphically the varying amount of superheat existing at every moment of the day.

It will be understood that we do not limit ourselves to the particular mechanism herein shown and described, for the same can be modified in various ways without departing from the principle of the invention, the scope of which is defined in the claims.

We claim as our invention:

1. In a superheat gage, the combination, with a chamber for superheated gas, of a thermometric device inserted in the chamber, a pair of movable members connected one with the thermometric device and the other with the interior of the chamber, whereby said members are actuated independently, one by the heat and the other by the pressure of the therein contained gas, a dial calibrated for degrees of superheat, and an indicator working over the face of the dial, said movable members being operatively connected with the indicator so as to give it a resultant movement corresponding to the amount of superheat in the gas.

2. In a differential gage, the combination, with a pointer, of a pair of sliding pivot pins, a pair of pressure-actuated devices arranged to be acted upon by separate sources of pressure and oppositely connected with said pivot-pins, respectively, and parallel motion linkage connecting said pivot-pins with each other and with the pointer.

3. In a superheat gage, the combination, with a chamber for superheated gas, of a thermometric device inserted in the chamber, a pair of spring members connected one with the thermometric device and the other with the interior of the chamber, whereby said members are actuated independently, one by the heat and the other by the pressure of the therein contained gas, a dial calibrated for degrees of superheat, and an indicator working over the face of the dial, said springs being oppositely connected with the indicator so as to give the same a resultant movement corresponding to the amount of superheat in the gas.

4. In a superheat gage, in combination, a dial calibrated for degrees of superheat, an indicator working over the face of the dial, a pair of spring tubes closed at their outer ends, one of the tubes being open at its inner end and the other tube being closed at its inner end and containing an expansible fluid, both of the inner tube-ends being adapted to be inserted into a chamber of superheated gas, and the outer tube-ends being operatively connected with the indicator so as to impart to the same a resultant movement corresponding to the amount of superheat in the gas.

5. A superheat gage comprising a dial graduated in one direction for time periods and in another direction for degrees of superheat, an indicator working over the face of the dial, clockwork mechanism for moving the dial so as to carry the time-period graduations successively past the indicator, a chamber for superheated gas, a thermometric device inserted in said chamber, and a pair of movable members connected one with the thermometric device and the other with the interior of the chamber, whereby said members are actuated independently, one by the heat and the other by the pressure of the therein contained gas, said movable members being operatively connected with the indicator so as to give it a resultant movement corresponding to the amount of superheat in the gas.

6. In a differential gage, the combination, with a pointer, of two coil spring tubes closed at their outer or free ends and arranged for communication at their inner ends with separate sources of fluid pressure, a pair of levers oppositely connected with the respective tubes, a pair of pivot-pins connected with the respective levers and guided to slide in parallelism, and linkage connecting the pivot-pins and pivotally connected with the pointer, whereby the pointer will be moved to an extent corresponding with the sum or difference of the movements of the tube-ends.

7. In a gage of the class described, the combination, with a pointer, of a pair of spring tubes closed at their outer ends, one of the tubes being open at its inner end and the other tube terminating in a closed bulb, both of the inner tube-ends being adapted to be inserted into a chamber of superheated gas, and means operatively connecting the outer ends of the tubes with the pointer so as to give the pointer a resultant movement corresponding to the amount of superheat in the gas.

8. In a gage of the class described, in combination, a pair of spring tubes closed at their outer ends, one of the tubes being open at its inner end and the other tube terminating in a closed bulb, both of said inner tube-ends being adapted to be inserted into a chamber of superheated gas, a dial calibrated for degrees of superheat, a pointer working over the face of the dial, and parallel motion linkage oppositely connected with the outer ends of the tubes and intermediately connected with the pointer for imparting to the pointer a resultant movement corresponding to the amount of superheat in the gas.

9. In a gage of the class described, in combination, a rotary dial graduated radially for degrees of superheat and circumferentially for time periods, a pivotally mounted pointer working over the face of the dial, a pair of spring tubes closed at their outer or acting ends, one of the tubes being open at its inner end and the other tube terminating in a closed bulb, both of the inner tube ends being adapted to be inserted into a chamber of superheated gas, and linkage oppositely connected with the outer ends of the tubes and intermediately connected with the pointer, for the purpose set forth.

10. In a gage of the class described, in combination, a dial graduated for degrees of superheat, a pointer working over the face of the dial, a pair of spring tubes closed at their outer ends, one of the tubes being open at its inner end and the other tube terminating in a closed bulb, both of the inner tube-ends being adapted to be inserted into a chamber of superheated gas, and means adjustably connected with the outer ends of the tubes and operating upon the pointer for giving the pointer a resultant movement corresponding to the amount of superheat in the gas.

In testimony whereof we affix our signatures in presence of two witnesses.

THOMAS M. LOTHROP.
GRANT D. BRADSHAW.

Witnesses:
A. F. Drees,
C. S. Seaver, Jr.